United States Patent [19]

Onofrio

[11] 4,213,437
[45] Jul. 22, 1980

[54] AIR-FILTER PURGER FOR INTERNAL COMBUSTION ENGINES

[76] Inventor: Carmen Onofrio, 300 Hemlock Dr., Orange, Conn. 06477

[21] Appl. No.: 961,860

[22] Filed: Nov. 20, 1978

[51] Int. Cl.² .................. B01D 46/04; F02B 77/00
[52] U.S. Cl. ..................... 123/179 A; 123/198 R; 55/302; 55/385 B
[58] Field of Search ............. 123/198 D, 142, 179 A, 123/179 F; 55/302, 385 B, DIG. 28

[56] References Cited

U.S. PATENT DOCUMENTS

| | | | |
|---|---|---|---|
| 1,080,765 | 12/1913 | Lemp | 123/142 |
| 2,420,822 | 5/1947 | Hallwood | 55/302 |
| 2,537,094 | 1/1951 | Schmidlin | 55/302 |
| 3,293,831 | 12/1966 | Hollyday | 55/302 |
| 3,371,634 | 3/1968 | Lalande | 123/198 D |
| 3,402,881 | 9/1968 | Moore et al. | 55/302 |
| 3,494,339 | 2/1970 | Fernandez et al. | 123/142 |
| 3,545,421 | 12/1970 | Strader | 123/198 D |
| 3,635,203 | 1/1972 | Gannoe | 123/198 D |
| 3,867,919 | 2/1975 | Grenier | 123/198 D |
| 4,129,040 | 12/1978 | Hayden | 123/198 D |
| 4,142,503 | 3/1979 | Hatz et al. | 123/198 D |

Primary Examiner—Ira S. Lazarus
Attorney, Agent, or Firm—St. Onge, Steward, Johnston, Reens & Noë

[57] ABSTRACT

A device for overcoming the problem of restarting an internal engine while it is still hot, in which means are provided for blowing air into the air filter of the engine each time it is restarted in order to purge the filter of non-combustible gases trapped inside the filter which prevent the engine from starting immediately.

7 Claims, 4 Drawing Figures

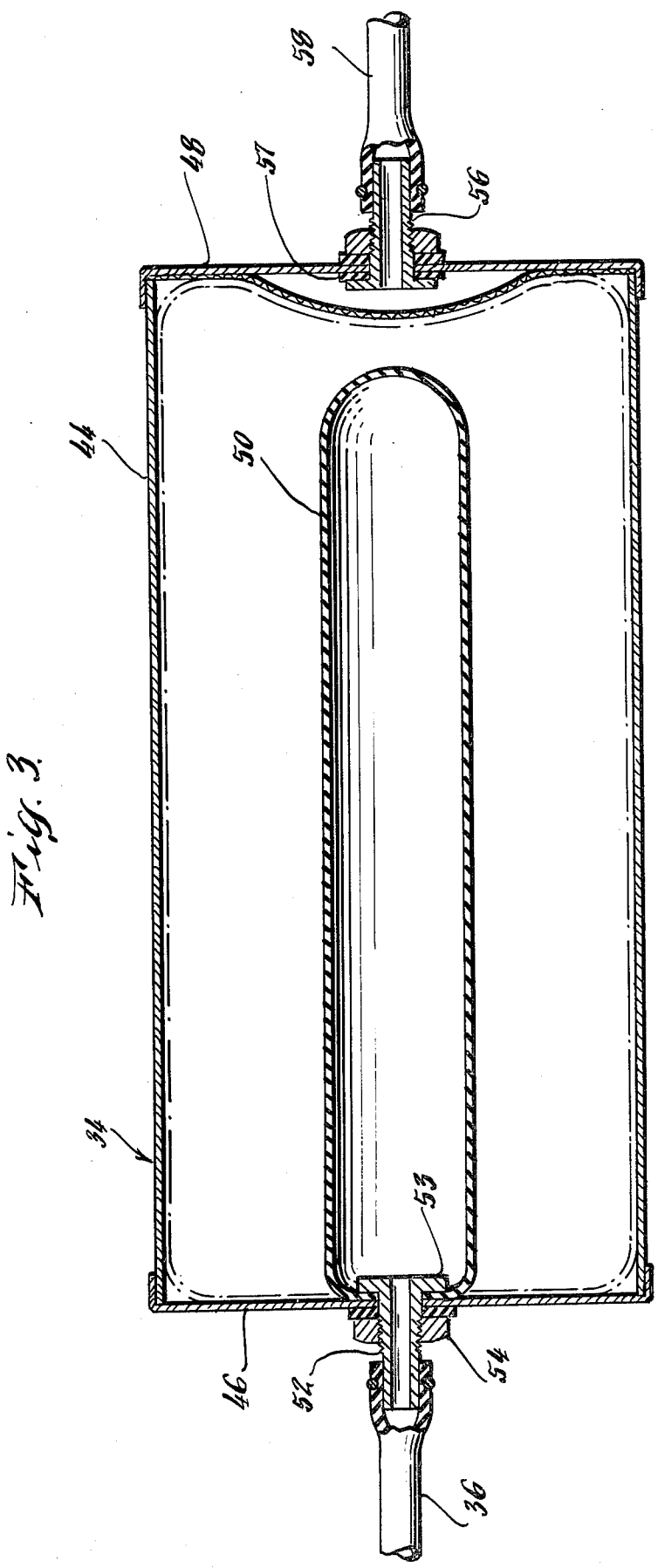

AIR-FILTER PURGER FOR INTERNAL COMBUSTION ENGINES

BACKGROUND OF THE INVENTION

The present invention relates to internal combustion engines and more particularly to the problem frequently encountered of restarting an automobile engine while it is still hot.

It has been found that despite complete and careful engine tune-ups, as well as major overhaul of the carburetor including particular attention to the fuel level and antipercolator valve, many engines will not start immediately while they are still hot. Depending primarily on how hot the engine is when it is turned off and on weather conditions, the car may be hard to restart for fifteen minutes or more, and in some cases for as long as four or five hours, after it has been shut off. In such situations the engine may have to be cranked over continuously by the starting motor for a full minute before it will fire. This of course places a severe drain on the battery, and contributes to pollution of the atmosphere when the engine finally starts and discharges quantities of partially burned exhaust gases.

It is common knowledge among automobile mechanics that simply by removing the air filter, the engine will usually start right away. The generally accepted explanation of the cause of "hot" starting problems is that gasoline fumes seep into the housing of the air filter and produce a flooding effect. However, contrary to this reasoning, I believe that non-combustible gases accumulate in the housing of the air filter, so that when the engine is turned over to start it, the air fed to the cylinders is so contaminated with unburnable fumes that it is incapable of supporting combustion of the fuel. Consequently, it is necessary to turn the engine over for a relatively long time before the incombustibles in the air filter can be drawn through the engine and clean air mixed with the fuel to produce the required mixture for combustion. Although the problem may be overcome by removing the air filter in which the non-combustible fumes accumulate, most people who drive an automobile do not want, or are not equipped, to do this, especially with the multitude of connections now being made to the air filter for emission control purposes.

On the other hand, by following the usually recommended procedure of holding the gas pedal down on the floor in order to open the throttle valve completely and at the same time turning over the engine, the non-combustible fumes may eventually be cleared out and the engine started without removing the air filter. Unfortunately, this practice frequently leads to further complications, such as flooding by pumping the gas pedal, which aggravates the problem instead of solving it. Furthermore, even if the engine starts by holding the gas pedal down in this manner, the non-combustible fumes pick up fuel and produce smoke which adds to pollution of the atmosphere.

I am not aware of any attempts to overcome hot-starting problems, other than those referred to hereinbefore. In addition, I believe I am the first to discover the real cause of the problem and to provide a simple and inexpensive way of overcoming it.

SUMMARY OF THE INVENTION

I have discovered that it is not gasoline fumes which build-up in the air filter, but rather, that it is the accumulation of non-combustible gases, such as carbon dioxide, rising from the hot engine through the intake manifold and carburetor, which become trapped inside the housing of the air filter. When the engine is then turned over to restart it, these non-combustible gases are drawn into the cylinders contaminating the air needed to support combustion, and the engine will not fire. With this in mind, I decided to blow air into the air filter before restarting the hot engine in order to displace some or all of the incombustibles trapped inside the filter. This resulted in the engine starting immediately, where before it would not restart while hot wihtout being cranked over for at least several seconds.

I then devised an automatic system for thus purging the air filter each time the engine is restarted, this system consisting basically of some means for blowing air into the filter and for controlling the air thus blown so that the filter is purged before, or while, starting the engine. The blower means may consist, for example, of a tank of air under pressure, while the control means may include means for activating such blower means when the starting system is actuated in order to restart the engine. Of course various ways may be provided for blowing air into the air filter and for controlling it so that the filter is purged each time the engine is restarted.

As employed herein, the term "purge" means partially, or completely, displacing the gases in the air filter with fresh air, and the term "air filter" refers to the unit through which air is drawn into the intake system of the engine, rather than to the filter element contained within the housing of the unit as a whole. The starting system for the engine is considered for present purposes to include, not only the starting motor circuit, but also an electrical ignition system for engines which burn fuels requiring spark-ignition.

The invention will be more clearly understood from the specific example disclosed hereinafter of one way of overcoming the problem of "hot starting" which I have found to be reliable, as well as practical from the standpoint of cost and ease of installation.

DETAILED DESCRIPTION OF PREFERRED EMBODIMENT OF THE INVENTION

The drawings illustrate a system for carrying out the invention which may be installed either on new engines as original equipment, or on already existing engines. In the drawings, FIG. 1 is a more or less diagrammatic side view of an internal combustion engine with parts broken away and in section, and showing an air-filter purging system in accordance with my invention installed thereon;

FIG. 3 is a longitudinal sectional view through the air-supply tank shown in FIG. 1.

Figure 1:
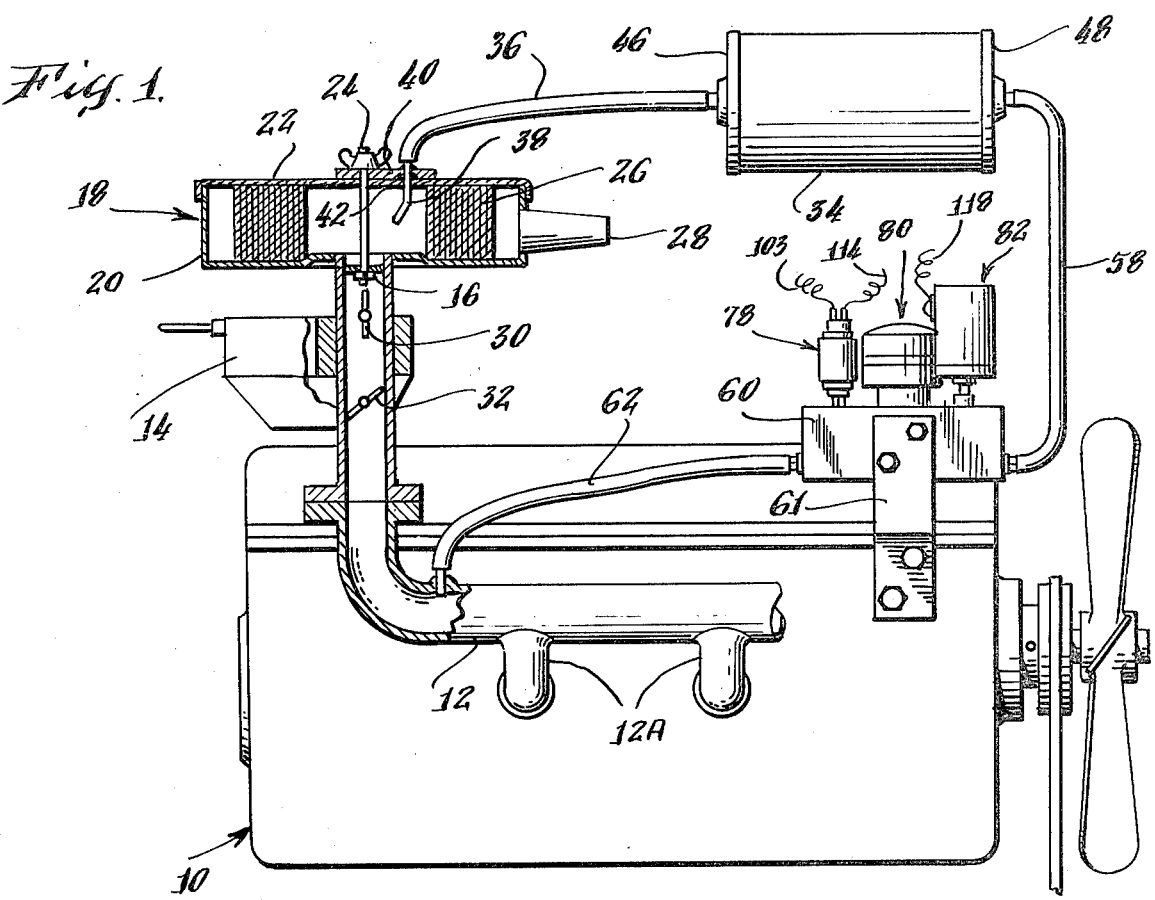

A typical gasoline automobile engine 10 is illustrated diagrammatically in FIG. 1 as having an intake manifold 12 from which a combustible gas-and-air mixture is drawn into the cylinders in the usual manner. Gasoline is mixed with air in a carburetor 14 as the air is drawn into the throat 16 of the carburetor from the air filter 18. Air filter 18 consists of the conventional housing 20 with a cover 22 held in place by a central bolt and wing-nut fastener 24. A ring-shaped filter element 26 is located concentrically within the filter housing 20 so that air is drawn into the housing 20 through the snorkle 28, flows around the outer circumference of the filter element 26 and then through it into the center where it passes downward through the throat 16 of the carburetor past a choke valve 30 and throttle valve 32.

When the engine has been run long enough to reach its normal running temperature and is turned off, a mixture of incombustible gases, including carbon monoxide and water vapor, as well as carbon dioxide, rise through the intake manifold 12 and the carburetor 14, and are trapped in the air filter 18 until they settle out as the engine cools, or eventually work their way out through the filter element 26. As these incombustible fumes are drawn back through the carburetor when restarting the engine, they pick up fuel which further complicates the problem by coating the electrodes of the spark-plugs with gasoline producing a flooding effect. When the engine finally fires, it produces smoke in the exhaust, adding to pollution of the environment. While production of smoke on starting hot engines has lead to the belief by most automobile mechanics that gasoline is puddling in the manifold, I have found little evidence of this in experiments I have conducted after a major tune up of the engine. I concluded therefore that the accumulation of incombustible material in the air filter must be what prevents the engine from firing, and I devised an automatic system for blowing air into the air filter each time the engine is restarted while hot, in order to purge the filter of these incombustibles.

To this end, the blower consists of an air-supply tank 34 mounted at a suitable place next to the engine 10, such as on the inner fender (not shown) of the automobile. An air hose 36 connects tank 34 to the cover 22 of the air filter 18 by means of a metal hose fitting 38 which is welded to a mounting plate 40. Mounting plate 40 is an elongated member extending to the cover bolt 24 with a hole at its other end which can be placed over the end of bolt 24 before the wing-nut is applied. When the wing-nut is threated onto bolt 24 and tightened, it holds the mounting plate 40 rigidly in place. An O-ring is placed around the fitting 38 under plate 40 to seal the fitting with the cover 22, a hole being provided in the cover through which the lower end or nozzle of fitting 38 extends. The nozzle portion of fitting 38 is desirably bent slightly in order to direct the air from the supply tank 34 directly toward the throat 16 of the carburetor.

As best shown in FIG. 3, air-supply tank 34 consists in this instance of a cylindrical metal outer housing 44 having end covers 46 and 48, and an elongated elastic bladder 50 connected at its open end to the air tube hose through the end cover 46. A metal hose fitting 52 having an enlarged circular flange 53 at one end seals the open end of bladder 50 against the inside of end cover 46, and a nut 54 is threaded onto the outer end of fitting 52 against a metal washer for rigidly fixing the fitting on cover 46, while at the same time clamping the open end of bladder 50 thereto.

A similar metal hose fitting 56 provided in the opposite end cover 48 opens into the housing 44, but not into bladder 50. Fitting 56 is held in place by a nut and is made air-tight by a suitable resilient washer 57 under the inner flange of the fitting.

By reducing the pressure below atmospheric in order to exert a partial vacuum on the inside of housing 44 externally of bladder 50 in a manner to be explained hereinafter, bladder 50 is inflated outward against the inner walls of container 44, as shown in phantom lines in FIG. 3, fresh air being drawn from air-filter 18 into the bladder. On rapidly releasing the vacuum in housing 44, bladder 50 collapses to its original shape, compressing the air inside and blowing it back through the hose 36 into air filter 18. It is apparent from the foregoing that the bladder 50 constitutes resilient means which in effect form "high-pressure and low-pressure sides" within the housing 44, a pressure greater than atmospheric being created within the bladder due to the resilience of the expanded bladder when the vacuum on the outside, or "low-pressure" side of the bladder is released. The same effect can of course be obtained by separating the tank into vacuum (low-pressure) and high-pressure sides using other types of resilient devices. In the specific arrangement shown, the term "high-pressure" is used only to distinguish one side of the bladder from the other, the pressure inside the bladder being greater than atmospheric only when the vacuum outside the bladder is released and before the badder completely collapses.

Figure 2:
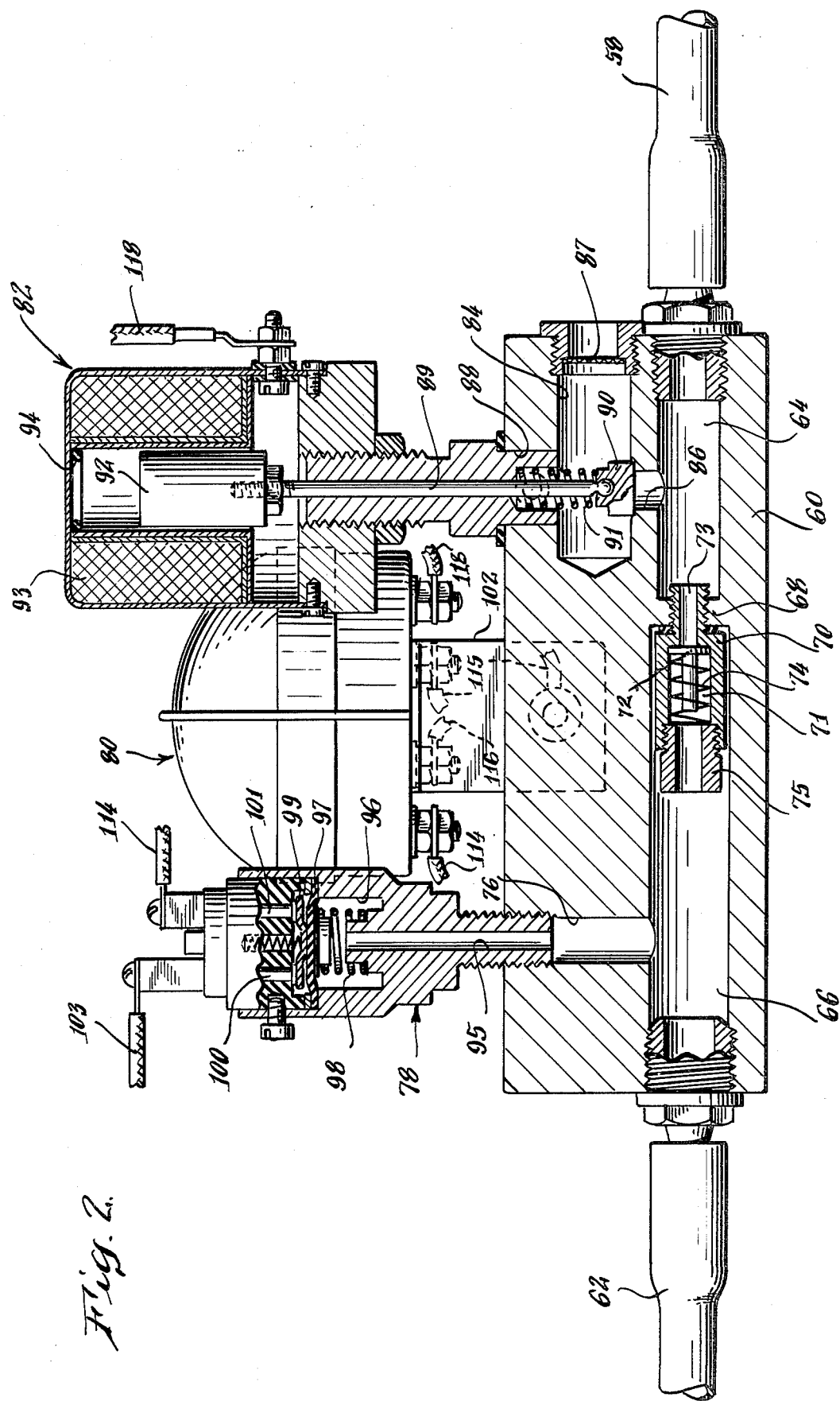
FIG. 2 is an enlarged vertical sectional view through the valve-body of the control means of the system shown in FIG. 1.

In order to reduce the pressure inside housing 44, but externally of bladder 50, below atmospheric pressure, housing 44 is connected by a hose 58 to a valve-body 60 (FIGS. 1 and 2) mounted by means of a plate 61 at any convenient place near or on the engine 10. Valve-body 60, in turn, is connected by means of another air hose 62 to a fitting on the intake manifold 12 of the engine. Plugs for making such connections are provided on most engines, but in those few cases where no connection is already provided, a hole can be easily drilled and tapped at a suitable point on the intake manifold, preferably near the branches 12a to the cylinders. As best seen in FIG. 2, suitable control means and passages are provided in valve-body 60 for exerting the vacuum in the intake manifold 12 on housing 44 when the engine is running in order to inflate the bladder 50 and for relieving the vaccum on housing 44 on restarting the hot engine, so that the air in bladder 50 is blown into the air filter 18.

To this end, a passage 64 is formed in one end of valve-body 60, the open end of passage 64 being threaded to receive a hose fitting for the tube 58. A second passage 66 extends axially of passage 64 from the opposite end of valve-body 60, the open end of passage 66 being also threaded to receive a fitting for the hose 62. The inner ends of passages 64 and 66 terminate a short distance from each other to form a central wall portion 68, which is drilled and tapped to receive the threaded end of a check-valve 70, that permits air to flow in one direction only from passage 64 to passage 66.

Check-valve 70 may be a conventional one-way valve, having an enlarged valve-chamber 71, in which a spring-loaded valve member 72 is confined for limited longitudinal movement into and out of seating engagement with a valve-seat formed at the inner end of valve-chamber 71 around a small passage 73 that extends from valve-chamber 71 axially through the threaded end of the check-valve 70 into passage 64. Passage 73 forms an orifice through which air is evacuated from the air tank 34 by the vacuum in the intake manifold 12. The seating surface of the head of valve-member 72 should be made of a suitable resilient material, such as neoprene, to ensure an air-tight seal when the valve closes on reduction of the vacuum in intake manifold 12, thereby maintaining the vacuum on the housing 44 of air tank 34, and ensuring that the air bladder 50 remains inflated after the engine has been turned off for a period of at least four or five hours. In addition, then spring 74 of check-valve 70, which is compressed between a threaded bushing 75 and the head of valve-member 72, should be calibrated to permit the valve-member 72 to open on the manifold vacuum reaching nine inches of mercury. In order to ensure smooth operation of the valve, the size of orifice 73 should be small enough to restrict too rapid flow of air from passage 64 to passage 66.

Extending upward from the passage 66 and opening at the top of valve-body 60 is a passage 76, which is tapped to receive the threaded end of a vacuum switch 78 in the actuating circuit for a relay switch 80 (FIGS. 1, 2 and 4) which, in turn, energizes a solenoid-operated small valve 82 mounted at the opposite end of valve-body 60 for releasing the vacuum in the housing 44 of air tank 34 when the engine is restarted. To this end, a large passage 84 is provided in the end of valve-body 60 adjacent and parallel to the passage 64 with a vent passage 86 connecting passages 64 and 84 for venting passage 64 to the atmosphere through a filter screen 87 in order to spill the vacuum.

Solenoid valve 82 is mounted in the top of valve-body 60 through an opening 88 aligned with the vent passage 86, and has a longitudinally movable valve stem 89, which extends across the passage 84 so that the valve member 90 at its lower end is positioned to engage a valve seat surrounding vent passage 86. A coil spring 91 around valve stem 89 urges the valve member 90 closed, the seating surface on valve member 90 being resilient to ensure an air-tight seal with its seat. Valve member 90 should also be mounted on stem 89 by means of a ball-and-socket joint in order to ensure proper alignment with the seat surrounding the passage 86. The upper end of valve stem 89 is attached to the core 92 of the solenoid within the field winding 93. A resilient bumper, such as O-ring 94, should be provided at the top of the housing to absorb the shock of the core when the coil is energized. On energization of coil 93, the valve stem 86 is pulled upward against the pressure of spring 91, opening the vent passage 86, thereby venting passage 64 and spilling the vacuum in the housing 44 of air tank 34.

Referring again to the vacuum switch 78, it will be noted that a passage 95 extends from passage 76 in the valve-body 60 to a chamber 96 which is closed at its upper end by a resilient diaphram 97. Diaphram 97 is urged upward by a coil spring 98 into engagement with a contact disc 99, which in turn engages a pair of contacts 100 and 101. Accordingly, when the engine is not running, the circuit across contacts 100 and 101 is closed, but when the engine is running the vacuum in intake manifold 12 opens the circuit across contacts 100 and 101 breaking the circuit to the actuating coil of relay 80.

Figure 4:
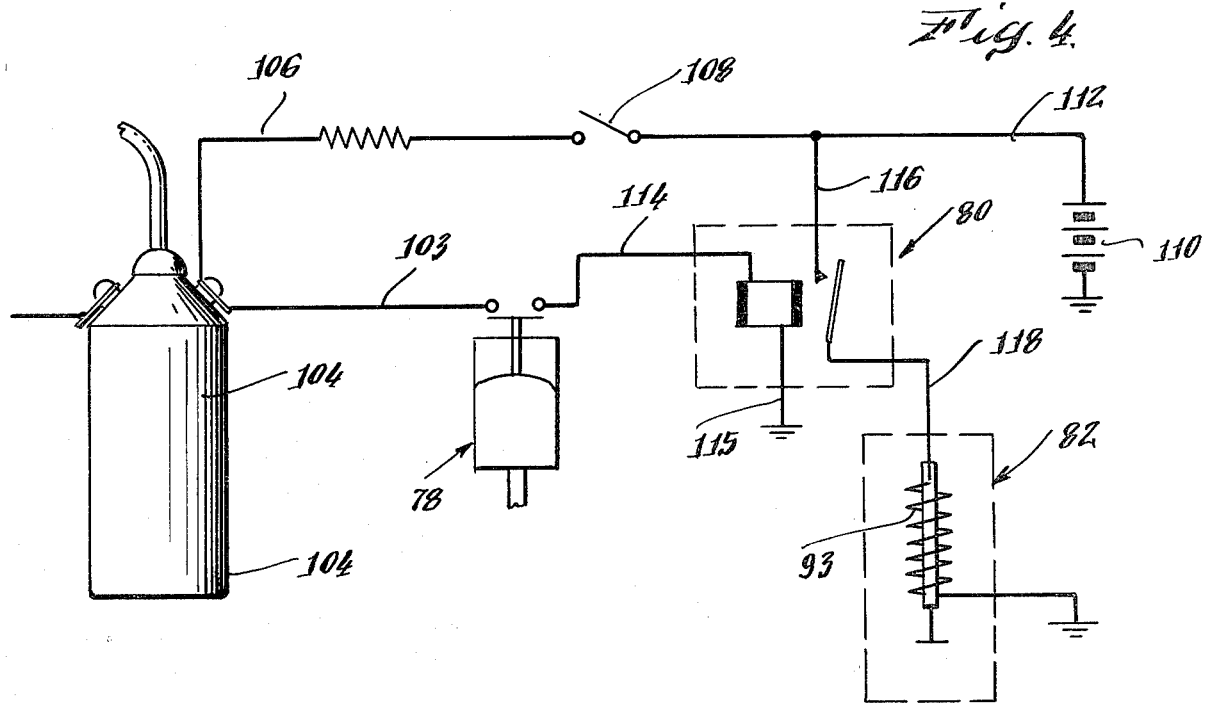
FIG. 4 is a wiring diagram of the control means for the system shown in FIG. 1.

Relay 80, which is conveniently mounted on the valve-body 60 by a bracket 102, is a conventional relay switch shown schematically in the wiring diagram of FIG. 4. However, in order to prevent "hunting" or chattering of the armature, which may occur if the unit is wired, as in the present case, into the ignition system of the automobile, it has been found desirable to use a 6-volt relay in a 12-volt system, thereby ensuring more positive action in closing the contacts when the winding of relay 80 is energized.

As shown in FIG. 4, the control unit just described is desirably wired by means of a lead 103 to the feed side of a conventional automobile ignition coil 104, lead 103 being connected at its other end to the terminal for contact 100 (FIG. 2) on vacuum switch 78. The feed wire 106 to the coil 104 is connected to the ignition switch 108 and then to the car battery 110 by means of a wire 112. A resistor or ballast 113, installed in the feed 106 of many recent automobile ignition systems, reduces the voltage from the usual 12-volts to about 9-volts, this being the reason for using a 6-volt relay 80 in the control system of the present invention. It will be understood, however, that a 9-volt relay designated specifically for a particular system can be used if desired.

The terminal for the other contact 101 of vacuum switch 78 is connected by a lead 114 to one side of the winding of relay 80, the other side of the winding being connected to ground by a wire 115. One of the terminals on the armature side of relay 80 is connected directly to the wire 112 on the hot side of battery 110 by means of a wire 116, while the other is connected by a wire 118 to the feed side of the winding 93 in solenoid valve 82. It should be noted that, if desired, the vacuum switch 78 could be connected directly to the ignition switch 108, rather than at the ignition coil, thereby by-passing the ballast 113. However, this requires a little more wire and is less convenient due to the fact that the wire must be fed through the firewall of the car to the ignition switch, or other manual control.

It should be noted that the solenoid valve 82 is referred to in the claims hereinafter as the "first control-member", while the vacuum switch 78 is referred to in the claims as the "second control-member". However, other specific control devices could of course be employed for the same purpose.

The filter-purging system of the present invention operates in the following manner. When the engine is cold and is first started, the bladder 50 in air tank 34 will probably be deflated, but will be inflated by the intake-manifold vacuum shortly after the engine starts. Thus, as soon as the manifold pressure drops to six inches Hg, the vacuum switch 78 which is calibrated to open at that pressure, de-energizes relay 80, thereby breaking the circuit to solenoid valve 82 in order to close the vent passage 86. Continued reduction of the manifold vacuum to below nine inches Hg causes check-valve 70 to open so that a vacuum is drawn on hose 58 to air tank 34, evacuating the air from inside housing 44 and causing the bladder 50 to expand against the inside of the housing. Fresh air is thus drawn into bladder 50 from the air filter 18 through the outlet hose 36 while the engine is running.

When the engine is turned off, the spill valve 82 remains closed due to the fact that the ignition switch 108 is open. Thus, even though the vacuum switch 78 closes when the manifold vacuum drops, relay 80 remains de-energized and the circuit to spill valve 82 remains open, so that its valve member 90 is urged by spring 91 against the valve seat for the vent passage 86. Since check-valve 70 is always closed when the manifold vacuum equals or is less than the vacuum in passage 64, the vacuum to the housing 44 of air tank 34 is trapped, and bladder 50 consequently remains inflated as long as the vacuum in the system holds. With proper sealing of the check-valve 70, valve member 90 of spill valve 82, as well as at the various hose connections, particularly the fitting 56 on the vacuum side of air tank 34, sufficient vacuum can be maintained to keep bladder 50 inflated for long periods after the engine is turned off.

Due to the fact that vacuum switch 78 is closed when the ignition switch 108 is turned on in order to restart the hot engine, relay 80 is energized closing the circuit to spill valve 82, thereby venting the vacuum side of air tank 34. This causes bladder 50 to collapse, forcing air through the hose 36 to fill the air filter 18 and purge it of the non-combustible gases trapped therein. As soon as the engine starts and the manifold vacuum drops to six inches Hg, vacuum switch 78 again opens, de-energizing the control circuit for solenoid valve 82 to close the vent passage 86. On reduction of the manifold vacuum below nine inches Hg, check-valve 70 again opens, causing bladder 50 to draw in a fresh supply of air as before.

It has been found that for best results the filter should be purged about five seconds before turning over the engine. This can be done in the specific air purging system described hereinbefore by turning the ignition switch to the normal running position for the desired length of time before turning it to the starting position. In addition the discharge line from the air-supply tank should be connected to the filter on the downstream side of the filter element, so that most of the non-combustible fumes trapped in the filter are blown out.

While the specific embodiment of the invention disclosed herein is preferred for automobile engines, other means of blowing fresh air into the air-intake of an engine may be employed. For example, in trucks which use compressed air, air could be readily supplied from the air-storage tank, thereby doing away with the need for an air bladder and vacuum system. In that case, it would only be necessary to provide an air valve which is actuated to supply enough air to the air filter on starting the engine.

What is claimed is:

1. For use with an internal combustion engine having an air filter for the air-intake system of said engine and a starting system therefor, a device for facilitating restarting said engine, comprising
   blower means connected to said air filter for purging said air filter, and
   control means for activating said blower means when said starting system is actuated in order to restart said engine, and for de-activating said blower means after said engine has started.

2. The device as defined in claim 1, wherein said starting system includes an electrical ignition system, said control means comprising a first control-member activated by said ignition system for actuating said blower means upon energization of said ignition system, and a second control-member in a circuit with said ignition system and said first control-member for interrupting said circuit after said engine has started.

3. The device as defined in claim 2, wherein said second control-member comprises a vacuum switch connected to the intake manifold of said engine such that said vacuum switch is closed when the manifold vacuum is below a predetermined level and open when the manifold vacuum reaches said predetermined level.

4. The device as defined in claim 3, wherein said blower means comprises a tank for air under pressure connected to said filter.

5. The device as defined in claim 4, wherein said air tank comprises
   a housing and a resilient bladder enclosed therein mounted to form a high-pressure side and a low-pressure side within said housing, said high-pressure side communicating with said air filter for passage of air therefrom to said filter,
   said control means further comprising duct-means connecting said low-pressure side of said housing to the intake manifold of said engine for reducing the pressure on said low-pressure side of said housing below atmospheric in order to expand said bladder, and a check-valve disposed within said duct-means for permitting flow of air from said housing only to said intake manifold,
   said second control-member comprising a vacuum switch communicating with said duct-means between said check-valve and said intake manifold,
   said duct-means having a vent located between said housing and said check-valve for releasing the vacuum in said housing in order to collapse said bladder,
   said first control-member comprising a solenoid-operated valve normally closing said vent,
   said control means further including a relay actuated by said vacuum switch for opening said solenoid-operated valve.

6. The device as defined in claim 5, wherein said duct-means comprises a valve-body having a passage connected at one end to said intake manifold and at its other end to said low-pressure side of said air-tank housing, said check-valve being disposed in said passage, said vaccum switch and said solenoid-operated valve being mounted on said valve-body for communication with said passage on opposite sides of said check-valve.

7. The device as defined in claim 1, wherein said starter system includes an electrical ignition system and said blower means comprises a tank having resilient means therein forming a high-pressure side and a low-pressure side within said tank such that when the low-pressure side is vented to the atmosphere, air is expelled from the high-pressure side, said high-pressure side communicating with said air filter for passage of air expelled therefrom into said filter,
   said control means having duct-means connecting said low-pressure side of said tank to the intake manifold of said engine for reducing the pressure on said low-pressure side below atmospheric in order to draw air from the atmosphere into said high-pressure side of said tank, and a check-valve disposed within said duct-means for permitting flow of air from said low-pressure side of said tank only to said intake manifold,
   said duct-means having a vent located between said tank and said check-valve for releasing the vacuum on said low-pressure side, thereby permitting said resilient means to expel the air on said high-pressure side into said air filter,
   said control-means further comprising a first control-member connected to said ignition system for opening said vent as soon as the engine ignition is turned on and a second control-member in a circuit with said ignition system and said first control member for closing said vent such that a vacuum is drawn by said intake manifold on said low-pressure side of said tank when said engine is running.

* * * * *